US005730400A

United States Patent [19]
Rinderer et al.

[11] Patent Number: 5,730,400
[45] Date of Patent: Mar. 24, 1998

[54] CABLE TRAY COVER SYSTEM

[75] Inventors: Eric R. Rinderer, Highland; Martin L. Witherbee, Edwardsville, both of Ill.

[73] Assignee: Sigma-Aldrich, St. Louis, Mich.

[21] Appl. No.: 522,759

[22] Filed: Sep. 1, 1995

[51] Int. Cl.$^6$ ........................................................ F16L 3/22
[52] U.S. Cl. ........................... 248/68.1; 248/58; 248/49
[58] Field of Search ............................ 248/58, 49, 68.1, 248/67.7, 62, 72; 174/101, 68.3, 97

[56] References Cited

U.S. PATENT DOCUMENTS

| | | | |
|---|---|---|---|
| 831,245 | 9/1906 | Share . | |
| 3,229,029 | 1/1966 | Weiss | 174/101 |
| 3,363,048 | 1/1968 | Vaughn | 248/68.1 |
| 3,401,721 | 9/1968 | George | 138/92 |
| 3,433,270 | 3/1969 | Fischer et al. | 138/162 |
| 3,576,305 | 4/1971 | Welsh | 248/68.1 |
| 3,785,598 | 1/1974 | Gillstrap | 248/58 |
| 4,232,845 | 11/1980 | Turner | 248/49 |
| 4,372,510 | 2/1983 | Skypala | 248/58 |
| 4,596,095 | 6/1986 | Chalfont | 52/126.6 |
| 4,840,333 | 6/1989 | Nakayama | 248/68.1 |
| 4,942,271 | 7/1990 | Corsi et al. | 174/101 |
| 5,004,192 | 4/1991 | Handler | 248/49 |
| 5,016,842 | 5/1991 | Suzuki et al. | 248/68.1 |
| 5,062,605 | 11/1991 | Muhlethaler | 248/68.1 |
| 5,123,618 | 6/1992 | Guterman et al. | 248/49 |
| 5,134,250 | 7/1992 | Caveney et al. | 174/101 |
| 5,199,675 | 4/1993 | DeGuchi | 248/62 |
| 5,235,136 | 8/1993 | Santucci et al. | 174/68.3 |
| 5,323,988 | 6/1994 | Handler | 248/49 |
| 5,564,658 | 10/1996 | Rinderer | 248/58 |

OTHER PUBLICATIONS

ADC Telecommunications; Plenum Fiber Guide Fiber Management Management Systems, dated 1993.
American Electric; Steel City Wire Management Systems for Industrail and Commercial Applications, date unknown.
Carlon, A. Lamson & Sessions Company; Egaline PVC Lay–In Wireway, Wiring Trough & Fittings, date unknown; admitted prior art.
Chalfont; Aluminum and Steel Ladder Style Cable Tray, dated Jul. 1995.
Hendry Telephone Products; Canales Para Fibras Opticas, dated Jan. 1992.
MSI Mono–Systems; Cable Tray Covers, dated Dec. 1994; admitted prior art.
Newton Instrument Company, Inc; Fiber Cable Management System, date unknown; admitted prior art.
Tii–Ditel; Lightrax Cableway System, dated Oct. 1994.
Warren & Brown & Staff; Fiber Optic Management Systems, Lightpaths, date unknown.

*Primary Examiner*—Leslie A. Braun
*Assistant Examiner*—Anita M. King
*Attorney, Agent, or Firm*—Senniger, Powers, Leavitt & Roedel

[57] ABSTRACT

A cable tray system comprising a cable tray for carrying cable, a support fastened to the cable tray, and at least one cover panel operatively associated with the support for covering cable carried by the cable tray. The cover panel is engageable with the support for pivoting about an axis generally parallel to a longitudinal axis of the cable tray between an open position in which the cover panel is swung up and away from the cable tray to permit access to cables in the tray and a closed position in which the cover panel is swung down to cover cables in the cable tray. The cover panel is removable from the support without removing the support from the cable tray.

32 Claims, 9 Drawing Sheets

5,730,400

CABLE TRAY COVER SYSTEM

BACKGROUND OF THE INVENTION

This invention relates generally to cable tray systems used to support electrical wiring, cables, conduit and data transmission lines, and more particularly to a cover system for use in connection with such cable tray.

Cable tray cover systems are used to protect the contents of the tray from falling debris, dirt, dust, water and other elements. Most conventional cover systems have serious drawbacks. For example, such systems typically comprise a series of panels mounted on one or more beams of the cable tray by hardware of various types (e.g., fasteners, clamps, etc.). In some instances, the cover panels and hardware are inseparable, so that the entire cover system must be mounted on the cable tray before it is installed, making installation more difficult. Also, to obtain access to the contents of the tray after it has been installed, the cover panels and all associated hardware must first be removed, and after the work is complete, the cover panels and all such hardware must be reinstalled. This is very time-consuming and inconvenient. Further, if the cable tray is supported by hangers, which is common, the cover panels of most conventional systems must be cut to fit the spacing between the hangers. This is not only very labor intensive, it also complicates reinstallation of the cover panels when they are removed to provide access to the cable tray. Conventional hinged cable tray covers also typically require a substantial amount of headroom, so that they cannot be used where the space above the cable tray is severely limited.

SUMMARY OF THE INVENTION

Among the several objects of this invention may be noted the provision of a cable tray cover system that is easy to install; the provision of such a cover system in which the cover panels are mounted on structures affixed to the cable tray for moving to an open position to provide ready access to the contents of the cable tray; the provision of such a system where the cover panels are automatically held in their fully open position; the provision of such a cover system in which the cover panels are readily disengageable from and reengageable with their mounting structures without the use of tools, thereby simplifying installation and reinstallation of the cover panels; the provision of such a cover system which is adaptable to any hanger spacing without making any modifications to the cover panels; the provision of such a cover system which is usable in situations where there is severely limited head space above the cable tray; the provision of such a cover system which is economical to fabricate and easy to install; and the provision of such a cover system which can be used with cable tray of any size (e.g., depth), thus reducing the number of cover sizes which need to be stocked.

Generally, a cable tray system of this invention comprises a cable tray for carrying cable. The cable tray has a longitudinal axis. The cable tray system further comprises support system fastened to the cable tray and at least one cover panel operatively associated with the support system for covering cable carried by the cable tray. The cover panel is engageable with the support system for pivoting about an axis generally parallel to the longitudinal axis of the cable tray between an open position in which the cover panel is swung up and away from the cable tray to permit access to cables in the tray, and a closed position in which the cover panel is swung down to cover cables in the cable tray. The cover panel is removable from the support system without removing the support system from said cable tray.

Other objects and features will be in part apparent and in part pointed out hereinafter.

BRIEF DESCRIPTION OF THE DRAWINGS

Corresponding parts are designated by corresponding reference numerals in the several views of the drawings.

DETAILED DESCRIPTION OF THE PREFERRED EMBODIMENT

Figure 1:
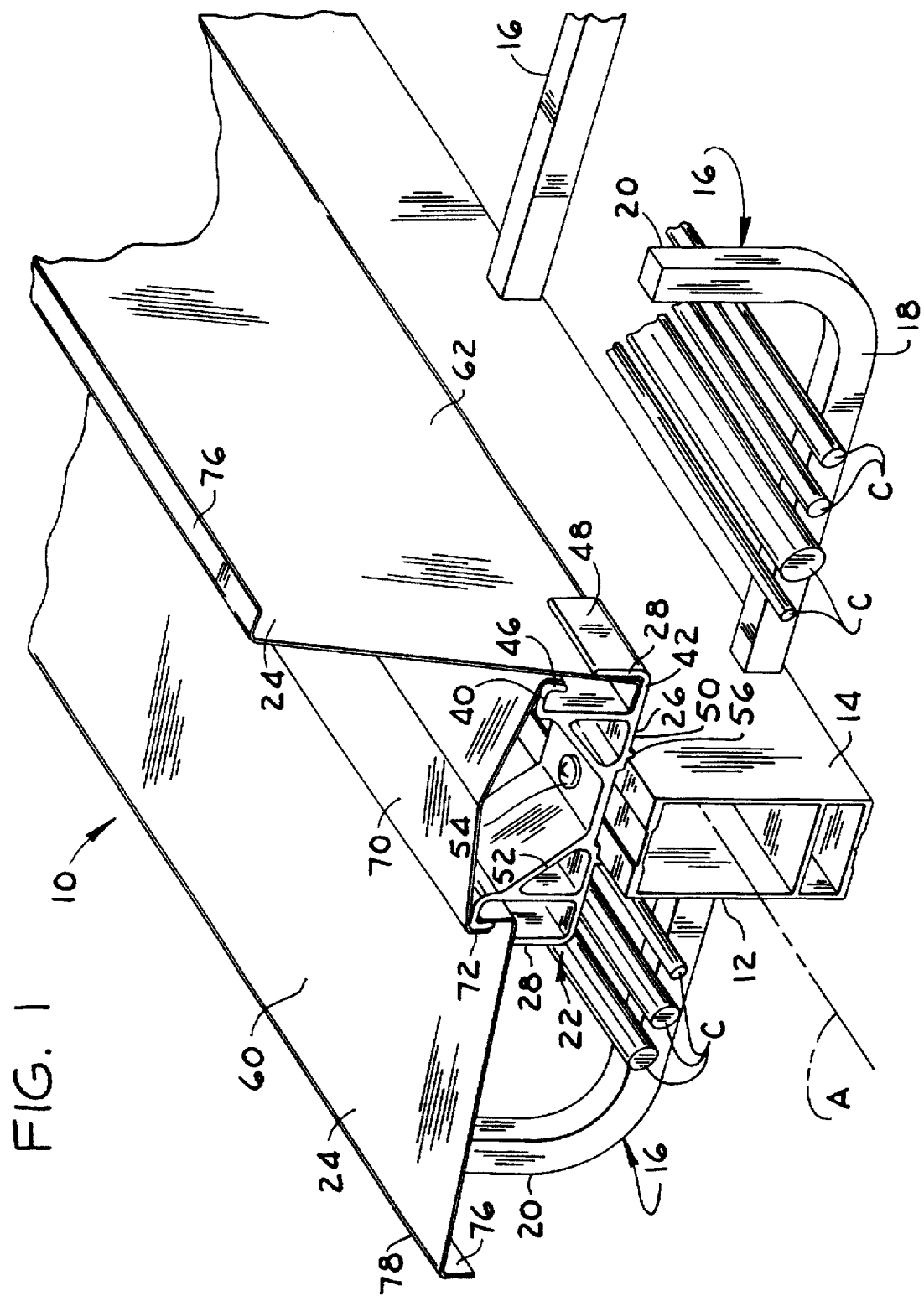
FIG. 1 is a perspective view of a cable tray system of the present invention.

Referring now to the drawings, and first to FIG. 1, there is generally indicated at 10 a cable tray system of this invention. The system 10 comprises cable tray 12 of the type disclosed in co-assigned pending U.S. patent application Ser. No. 08/175,591, which is incorporated herein by reference. The cable tray 12 has a central longitudinal axis A and includes a center beam 14 and a plurality of arms each designated 16, extending laterally outward from opposite sides of the center beam for carrying cable. Each arm 16 has a straight horizontal inner section 18 and an upwardly bent outer section 20. Cable trays 12 of this type are typically used for supporting runs of data transmission lines and other types of electrical cable. The cable tray system 10 of this invention also includes support system generally indicated at 22, adapted for attachment to the center beam 14 of the cable tray 12, and a pair of cover panels 24 operatively associated with the support system 22 for covering the cable carried on the cable tray.

Figure 2:
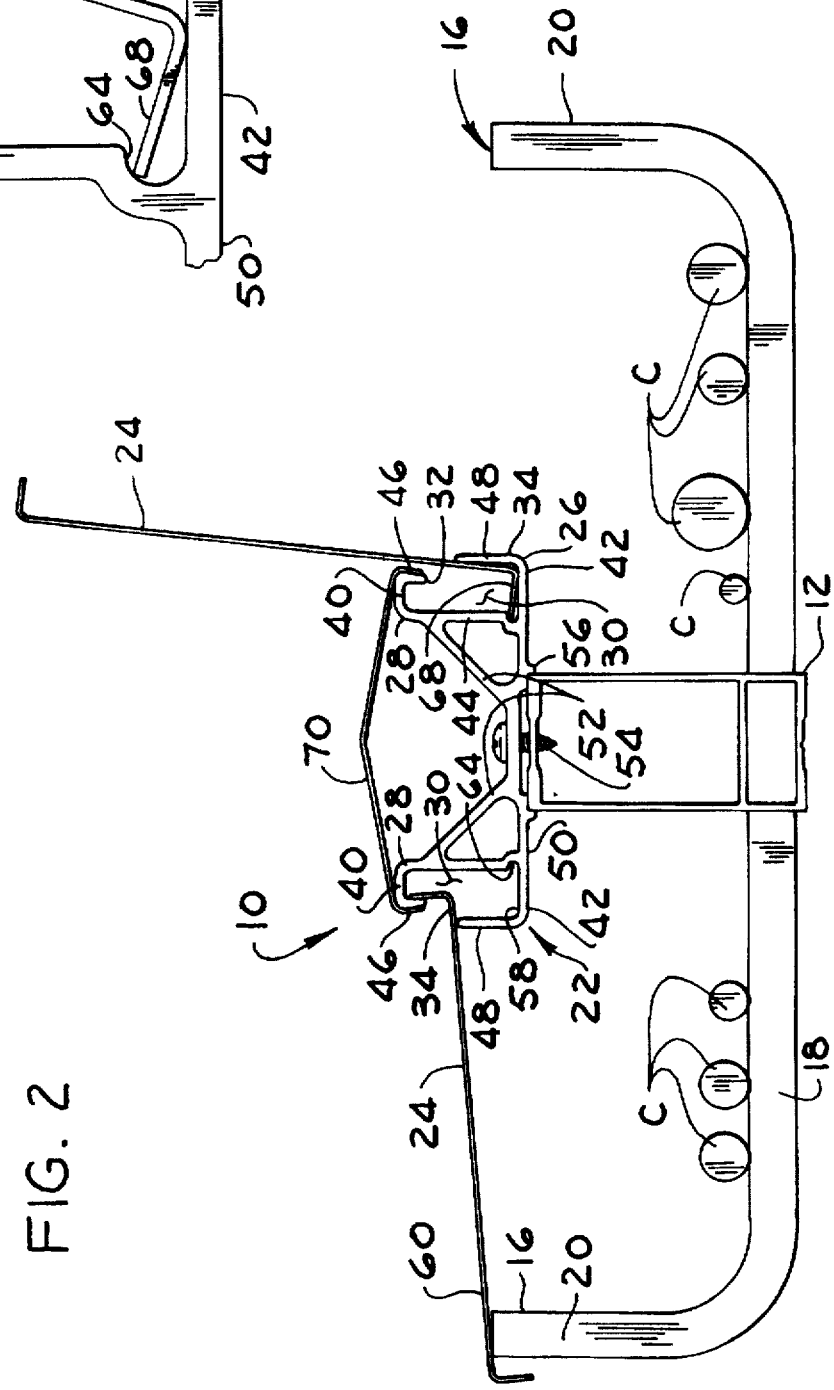
FIG. 2 is a left end elevation of the cable tray system of FIG. 1.

As shown in FIG. 2, support system 22 comprises one or more supports 26, each of which includes two C-shaped channel structures 28 defining two cavities 30 at opposite sides of the support (see FIG. 2). Each structure 28 has a slot 32 formed therein providing access to the cavity defined by the structure. Each cover panel 24 has an inner edge margin 34 receivable in the slot 32 and cavity 30 of a respective structure 28. The inner edge margin 34 may be inserted laterally through the slot 32 into the cavity 30. The cover panel 24 is engageable with the structure 28 for pivoting between an open position (see the right cover panel of FIG. 2) in which the cover panel is swung up and away from the cable tray 12 at a respective side of the center beam 14 to permit access to cables C in the tray and a closed position (see the left cover panel of FIG. 2) in which the cover panel is swung down to cover cables in the cable tray. The cover panel 24 is removable from the support system by moving the edge margin 34 of the panel 24 laterally outwardly through the slot 32.

Each C-shaped channel 28 defining a cavity 30 has upper and lower walls 40, 42, a side wall 44 connecting the upper and lower walls, an upper flange 46 extending down from the upper wall, and a lower flange 48 extending up from the lower wall. The upper and lower flanges 46, 48 terminate in edges defining the slot 32 therebetween. The slot 32 has a width greater than the thickness of the cover panel 24 so that the inner edge margin 34 of the cover panel 24 may be inserted laterally through the slot 32. The C-shaped channels 28 are rigidly connected by a base 50. The support 26 further includes two braces 52 extending up from the base 50 to the side walls 44 of the channels 28. The braces 52 provide additional structural support for the channels 28 and prevent bowing of the base 50 due to loads exerted by the cover panels 24 on the channels. The base 50 extends out only a short distance beyond the center beam 14 so that it does not interfere with installation or removal of cables on the cable tray 12.

Means, such as screws 54 or other fasteners, is provided generally at the center of the base 50 for fastening the support 26 to the center beam 14. The support 26 is fastened to the center beam 14 in a position wherein the slots 32 extend generally parallel to the center beam 14. The underside of the base 50 is formed with spaced apart positioning members 56 which are engageable with opposite sides of the center beam 14 of the cable tray 12 to properly position the base on the beam in a transverse direction with respect to the beam. The positioning members 56 also provide reinforcement against downward bowing of the support member 26 under a load.

Figure 4:
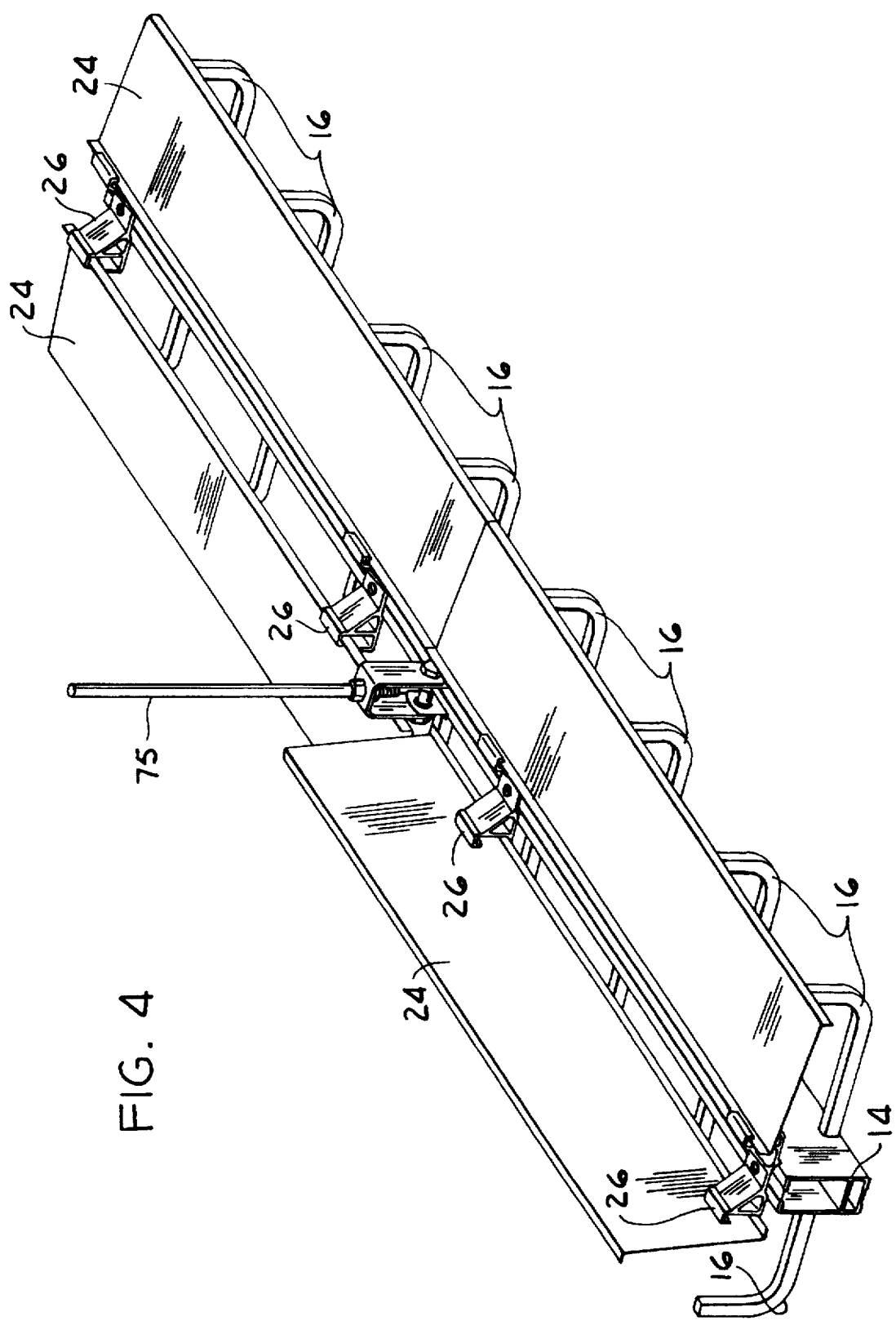
FIG. 4 is a perspective view of the cable tray system of FIG. 3 without center covers installed.

The support 26 is preferably (but not necessarily) extruded from aluminum, rigid plastic or other suitable material and cut to the appropriate length. This length may vary, depending on the circumstances. For example, in the embodiment shown in FIG. 4, two relatively short, spaced apart supports 26 are provided for supporting each pair of cover panels 24, the two supports 26 being fastened to the beam 14 generally adjacent opposite ends of the panels. Alternatively, a support 26 could be cut (or otherwise formed) longer so that it has a length corresponding to the full length of a cover panel, or even greater. Moreover, the support system may comprise two separate structures for supporting the left cover panel and right cover panel independently. Thus, it will be understood that the length, number and spacing of the supports 26 along the beam 14 may vary so long as the cover panels 24 are properly supported.

When a cover panel 24 is pivoted to its open position, the inner edge margin 34 of the cover panel slides down into a lower portion 58 of the cavity 30 into a position in which it is engageable with the channel 28 to hold the cover panel in its open position without assistance (see the right cover panel in FIG. 2). With the cover panel 24 in its open position, a top surface 60 of the cover panel faces and is generally parallel with the side wall 44 of the channel, while a bottom surface 62 of the panel rests against the lower flange 48 of the channel. The C-shaped channel 28 is configured such that the lower wall 42 of the channel has a width greater than the width of the upper wall 40. As a result, the lower wall 42 extends out from the side wall 44 further than the upper wall 40 so that the cover panel 24 can extend from the lower portion 58 of the cavity 30 up through the slot 32 and beyond without interference from the lower flange 48.

Figure 2A:
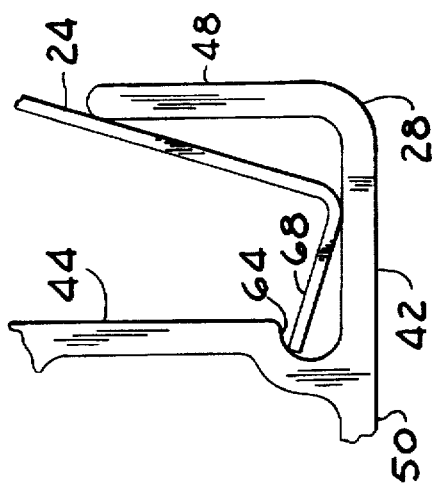
FIG. 2A is an enlarged portion of FIG. 2 showing details of a C-shaped channel.

The inner edge margin 34 of each cover panel 24 is formed with a lip 68 extending upward therefrom for engaging the C-shaped channel to hold the cover panel 24 in its open position. To hold the cover panel 24 in its open position, the height of the lower flange 48 is preferably greater than the width of the lower wall 42 and the lip 68 preferably has a depth not substantially less than the width of the lower wall 42. This allows the lip 68 to be engageable with the side wall 44 of the channel to hold the cover panel 24 in its open position. A notch 64 may be formed in the side wall 44 of the channel 28 for receiving the lip of the cover panel to further stabilize the cover panel 24 in its open position (FIGS. 2 and 2A).

When the cover panel 24 is closed, the lip 68 extends upwardly from the panel and is engageable with the upper flange 46 of the C-shaped channel to prevent lateral movement of the cover panel out of the cavity 30. The height of the lower flange 48 should be sufficient to allow engagement of the lip 68 of the cover panel 24 with the upper flange 46. Moreover, the top of the lower flange 48 should be above the upper ends of the outer sections 20 of the arms 16 so that when closed, the cover panel 24 rests on the arms 16 and assumes a downwardly sloping position. This slope assists in shedding liquid and debris off the cover panel. A downward extending lip 76 is provided on an outer edge margin 78 of each cover panel 24 to direct the flow of liquid down and away from the cable C in the tray. The lip 76 may also be used to secure the cover panel 24 to one of the arms 16 of the cable tray 12 by means of a screw or other fastening means (not shown) connecting the lip to the arm.

Figure 3:
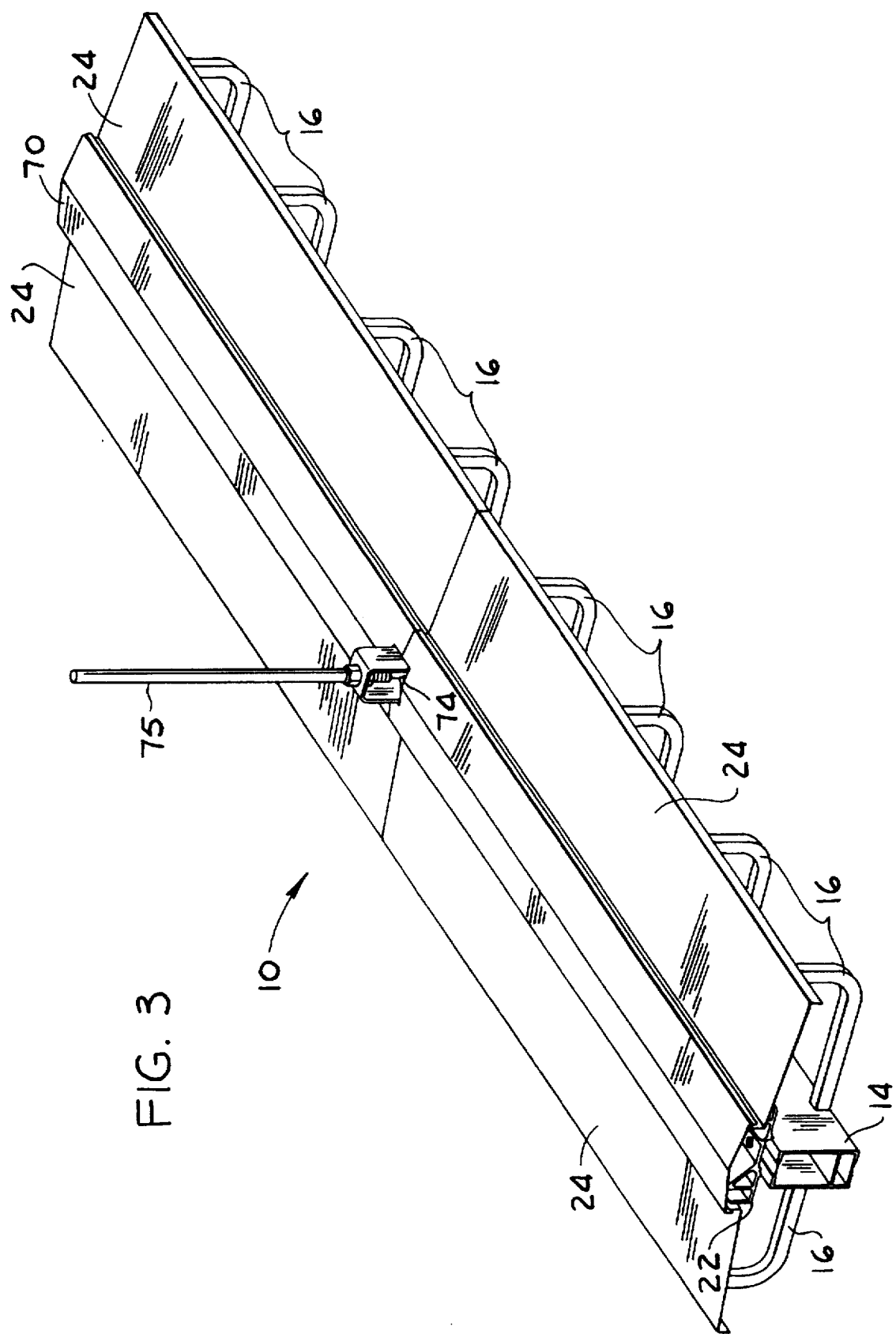
FIG. 3 is a perspective view of the cable tray system of FIG. 1 supported by a vertical hanger.

As shown in FIG. 3, a center cover 70 spans the structures 28 above the base 50 for covering the supports 26 and the center beam 14. The center cover has a pair of upper surfaces which slope downwardly away from a peak along the centerline of the cover, and a pair of depending flanges 72 along opposite sides of the cover. These flanges extend down on the outside of the upper flanges 46 of the channel 28 and are releasably frictionally engageable with the flanges 46 for retaining the center cover in place and permitting quick attachment and detachment of the center cover 70 to and from the support 26. The sloping surfaces of the center cover function to deflect liquid and debris off the center cover down toward the cover panels 24.

The center cover 70 may be formed in sections of suitable length. Where the cable tray 12 is supported by vertical hangers 75, as shown in FIG. 3, this length may correspond to the spacing between adjacent hangers. The ends of adjacent sections of the center cover are preferably formed with notches 74 to accommodate these hangers 75. If the vertical hangers 75 are too closely spaced, the center cover 70 may be eliminated entirely.

The cover panels 24 and center cover 70 may be made of metal (such as 20 gauge sheet aluminum) or any suitable polymeric material.

Figure 5:
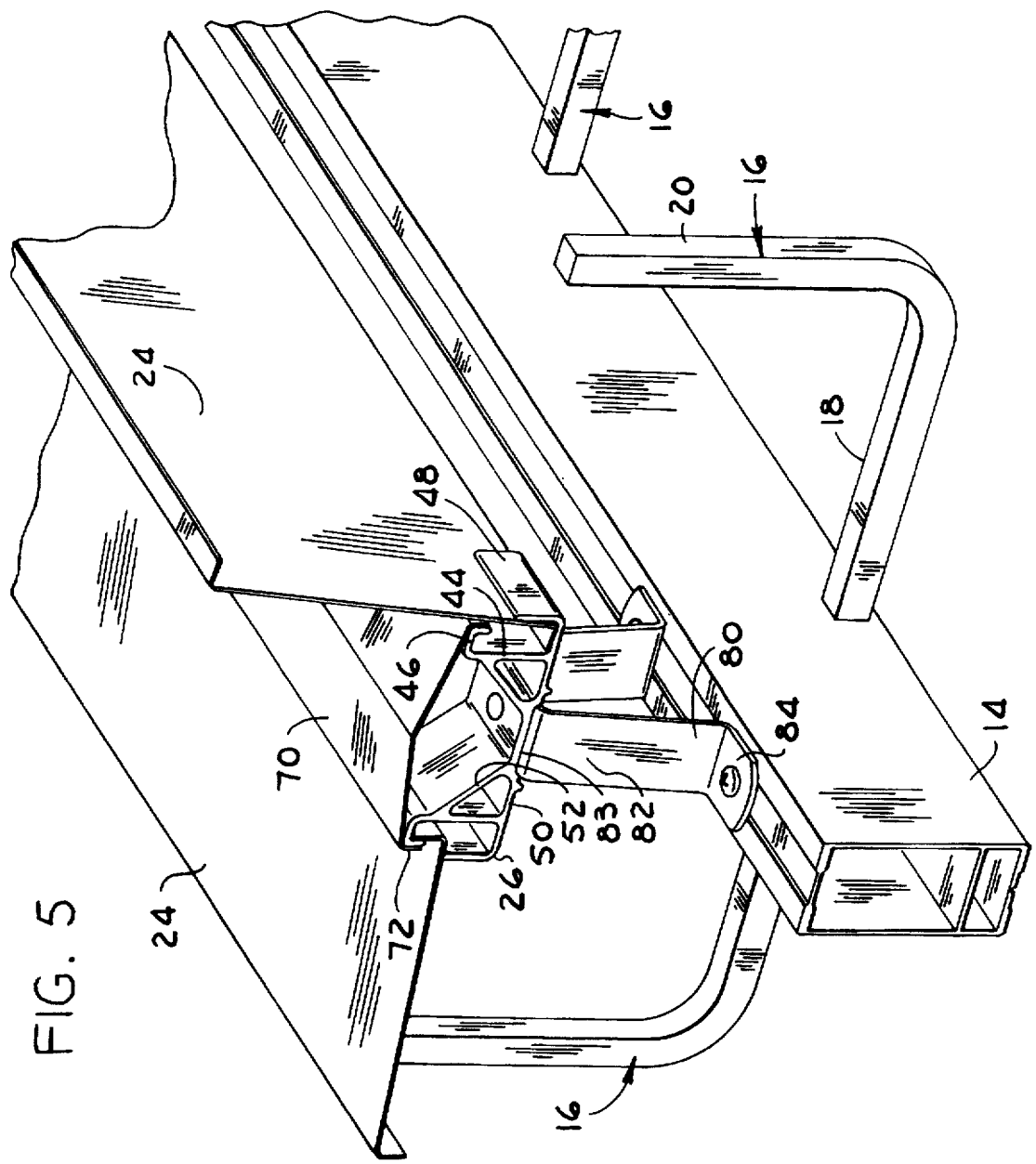
FIG. 5 is a perspective view of a support mounted above a center beam of a cable tray by means of a stand-off.

Referring to FIG. 5, a stand-off 80 may be used to mount a support 26 on the center beam 14 of the cable tray 12 at a predetermined elevation above the beam. The stand-off 80 may be made to have any height thus allowing the use of the same support 26 with cable tray 12 of any depth (the depth being the vertical dimension from the bottom of the beam 14 to the horizontal plane containing the upper ends of the outer sections 20 of the arms 16). The stand-off 80 comprises a bracket 82 of inverted U-shape having feet 84 extending outward from the legs of the bracket for attachment to the center beam 14. The support 26 is fastened to the upper surface of the bracket 82 by a screw or similar fastening means. The support 26 includes a recessed portion 83 located between the positioning members 56 to receive the bracket 82 and prevent lateral movement of the support relative to the bracket. The bracket 82 may be formed from metal or any other suitable material. It is to be understood that the stand-off 80 may take on other forms and still fall within the scope of the present invention.

Figure 6:
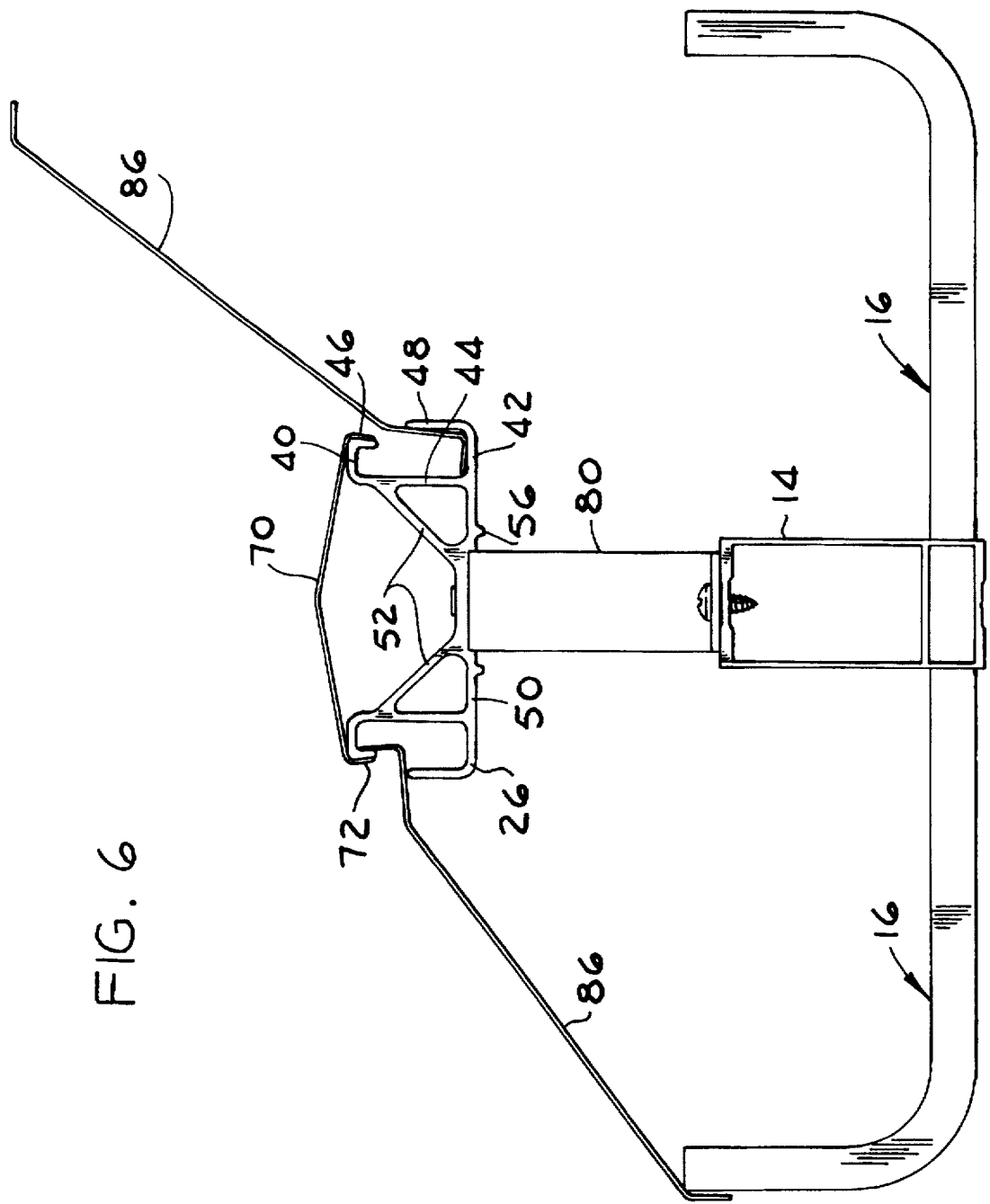
FIG. 6 is an elevational view of a cable tray system similar to that shown in FIG. 5, but with sloped cover panels.

The stand-off 80 may be sized to mount the support 26 at an elevation where the cover panels 24, when closed, are in a generally horizontal position, as illustrated in FIG. 5. Alternatively, the stand-off may be sized to mount the support 26 at a higher elevation so that the cover panels 86, when closed, slope downwardly at a desired angle toward the arms 16 (FIG. 6). The sloped cover panels 86 may be used where the cable tray 12 is exposed to a lot of falling debris or dripping liquid. The sloped configuration allows the debris or liquid to flow more readily off the cover panel 86, thus reducing the load carried by the cover panel and cable tray 12.

Figure 7:
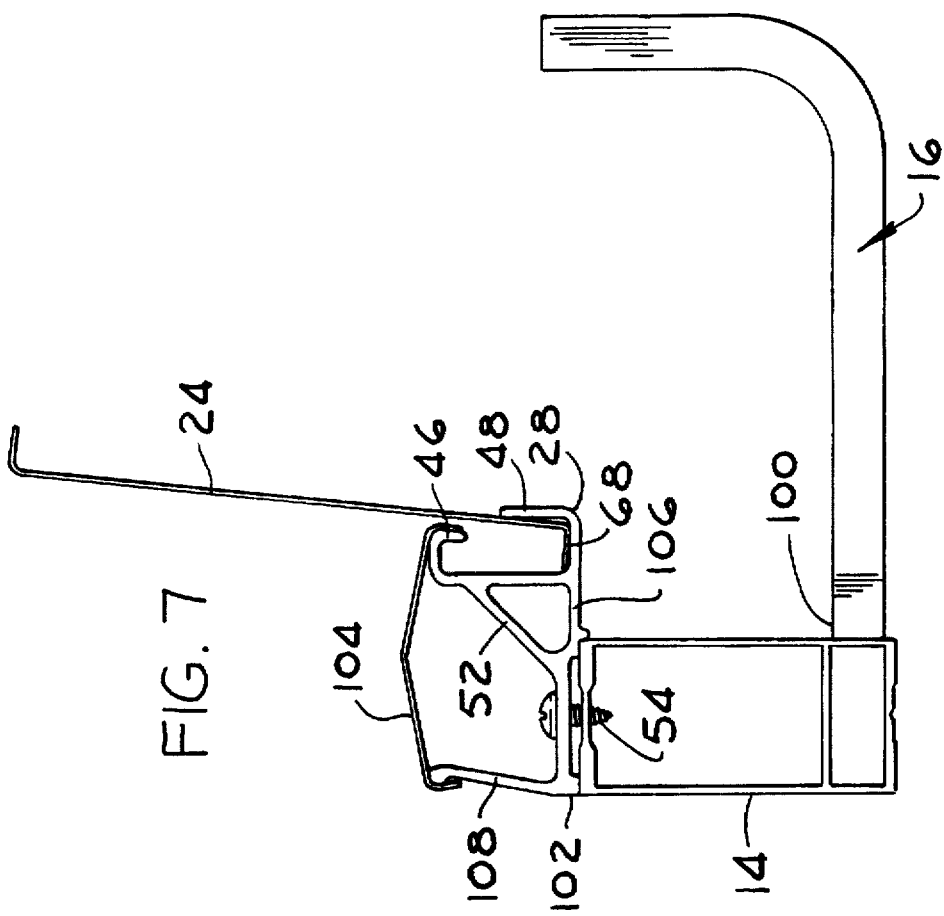
FIG. 7 is an elevational view of a second embodiment of the cable tray system of this invention.

FIG. 7 illustrates a second embodiment of this invention involving the use of cable tray 100 having arms 16 extending from only one side of the center beam 14. In this embodiment, the support system comprises a support 102 having a base 106 and a single C-shaped channel structure 28 at one side of the support defining a cavity 30. The configuration and operation of the cover panel 24 and channel structure 28 are the same as described above in regard to the embodiment of FIGS. 1–5. A brace 52 interconnecting the base 106 and the channel structure 28 provides additional structural support, as previously described. The system also includes a center cover 104 supported by the channel structure 28 and by a generally vertical wall 108 extending up from the opposite side of the base 106. The center cover has depending flanges which extend down on the outside of the channel structure 28 and the vertical wall 108 to releasably retain the cover on the support 102.

Figure 8:
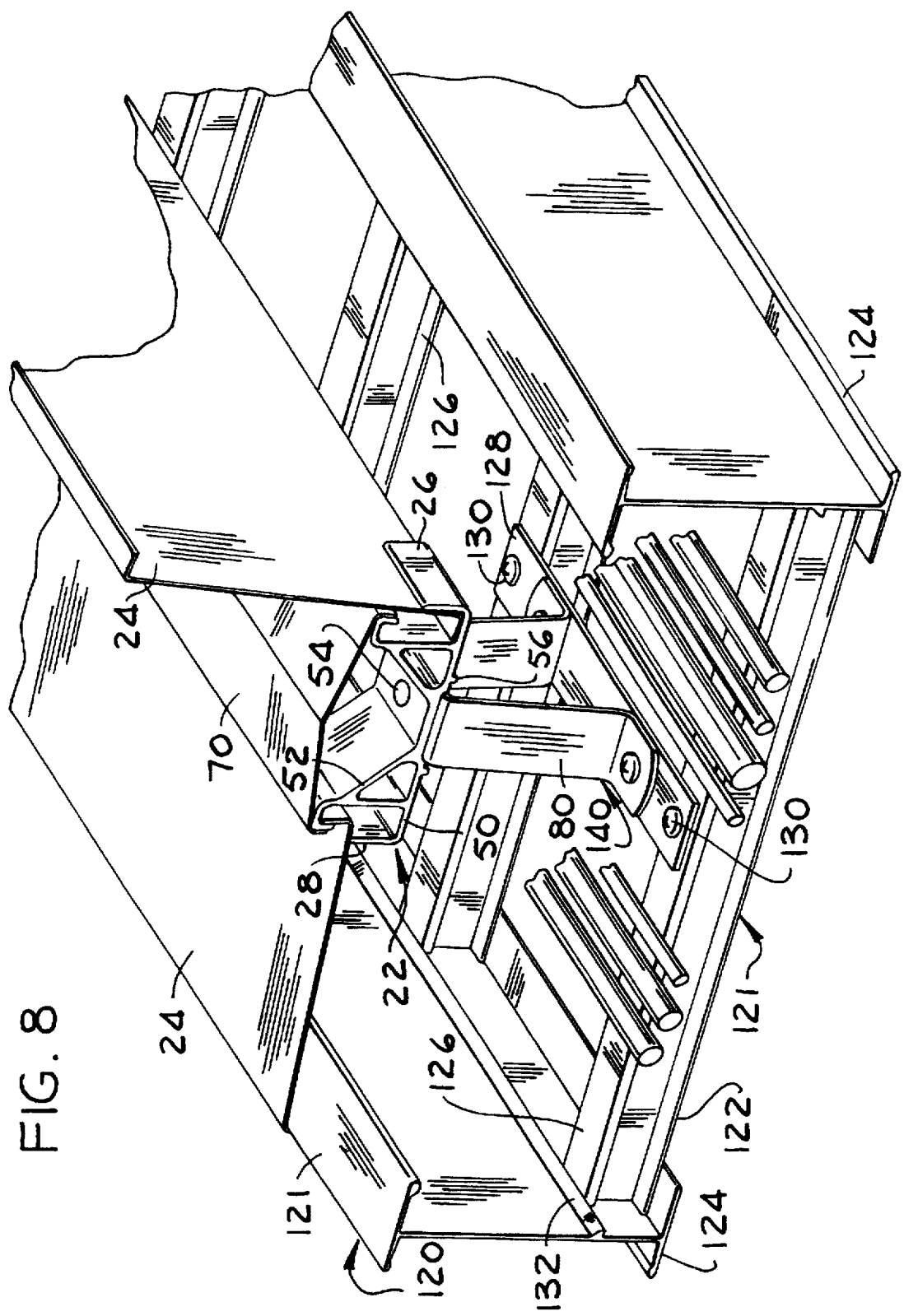
FIG. 8 is a perspective view of a third embodiment of the cable tray system of this invention.

FIG. 8 illustrates a third embodiment of this invention involving the use of a ladder type cable tray generally indicated at 120. The cable tray 120 includes a center section (generally indicated at 121) extending between two side rails 124. Each side rail 124 may be formed in the shape of an I-beam or any other suitably shaped structural beam. The center section 121 comprises a plurality of cross rungs 122 extending between the side rails 124. The side rails have shoulders 132 spaced above lower flanges 126 for receiving the ends of the cross rungs therebetween. The cross rungs 122 are typically welded to the side rails, but may be attached by any other suitable means. The center section may also be formed from a solid metal plate. It is to be understood that the center section may take on other configurations and still fall within the scope of the invention.

Figure 9:
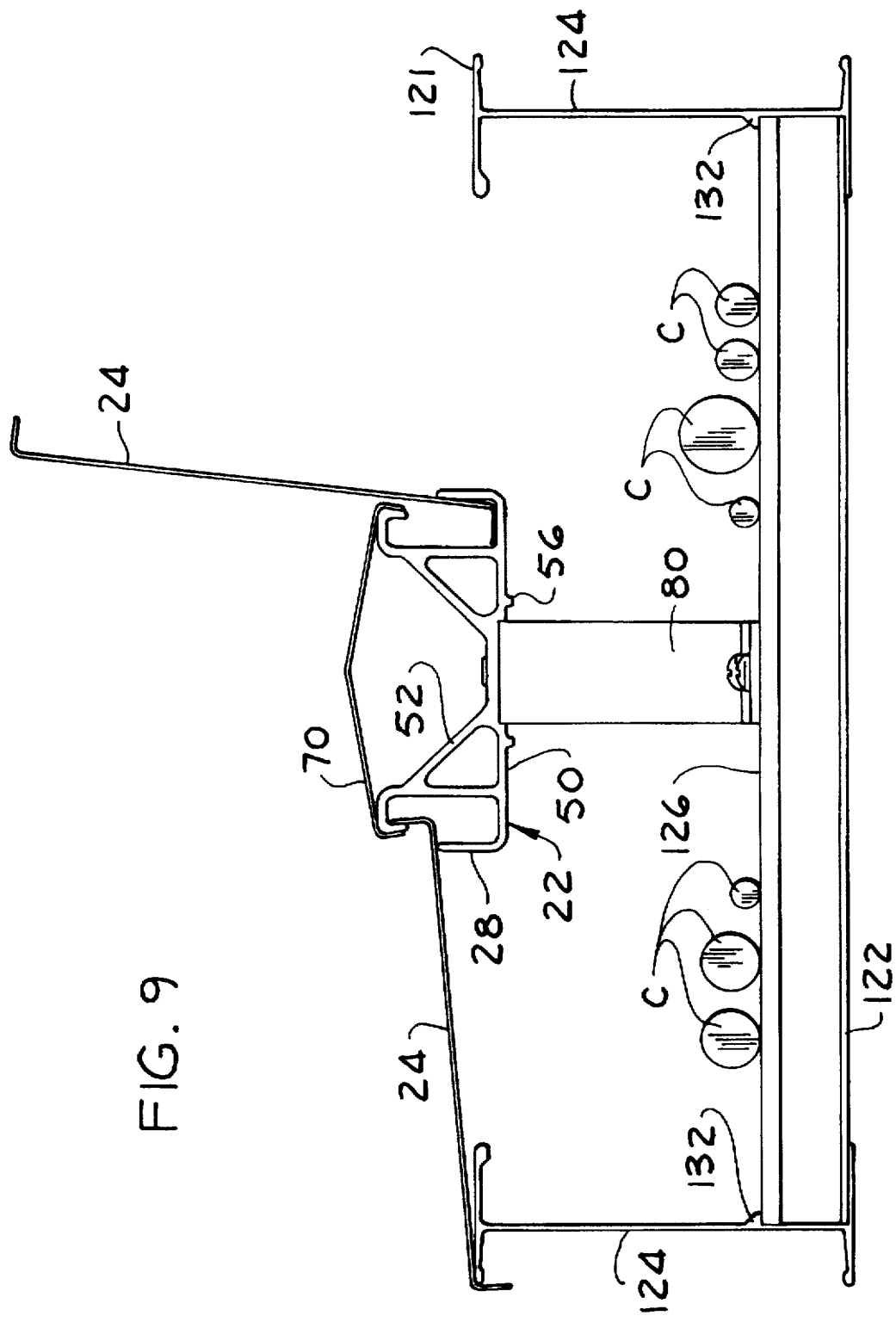
FIG. 9 is a left end elevation of the cable tray system of FIG. 8.

The system further comprises stand-off means generally designated 140 for mounting a support 26 on the center section 121. The stand-off means 140 comprises a stand-off 80. The stand-off 80 is configured as discussed above. The stand-off 80 is mounted on a strip of metal 128 which is attached to a pair of cross rungs by screws 130 or other suitable attachment means. The support 26 is fastened to the stand-off 80 in the manner previously described and the cover panels 24 and center cover 70 are of the same configuration as described above for the first embodiment of this invention. As shown in FIG. 9 the stand off 80 may be sized to mount the support 26 at an elevation where the cover panels 24, when closed, rest on the side rails and assume a downwardly sloping position.

To use the cable tray system 10 of this invention, the supports 26 are fastened to the cable tray 12, 120 (or if stand-offs 80 are being used, the stand-offs which have been previously attached to the supports are attached to the cable tray). If required, the appropriate sections of the center cover 70 are notched to accommodate the vertical hangers 75 extending up from the cable tray 12, 120. The cable tray 12, 120 may then be installed by using vertical hangers 75 or other suitable means. The center cover sections 70 are snapped into place over the upper flanges 46 of the C-shaped channels 28. After placing the cable, conduit and/or transmission lines on the cable tray 12, 120 the cover panels 24 are positioned over the cable. Each panel 24 may be installed from a location alongside the center beam 14 or side rails 124 by inserting the lip 68 and inner edge margin 34 into and through the slot of a respective structure 28. The cover panel 24 may also be installed from one end of the center beam 14 or side rails 124 by inserting one end of the lip 68 and inner edge margin 34 of the cover panel 24 into the C-shaped channel 28 and sliding the cover panel along the length of the center beam or side rails. If access to the cable is required, the cover panel 24 can be swung up and away from the cable tray 12, 120 where it will remain in a fixed position until a force is applied to close the cover panel. If there is not sufficient area above the cover panel 24 to allow for the panel to be swung open, the panel can be slidably moved in a direction parallel to the center beam 14 or side rails 124 to provide access to the cable. This latter step may involve sliding the panel to a position in which it overlies an adjacent cover panel. If required the cover panels 24 may be completely removed from the support 26 without removing the support 26 from the cable tray 12, 120.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A cable tray system comprising a cable tray having a central longitudinal axis and comprising a center beam and arms extending laterally outward from the center beam for carrying cable, a support system comprising at least one support fastened to the cable tray, and at least one cover panel operatively associated with the support system for covering cable carried by the cable tray, the cover panel being engageable with the support system for pivoting about an axis generally parallel to the longitudinal axis of the cable tray between an open position in which the cover panel is swung up and away from the cable tray to permit access to cables in the tray, and a closed position in which the cover panel is swung down to cover cables in the cable tray, the cover panel being removable from the support system without removing the support system from said cable tray.

2. A cable tray system as set forth in claim 1 wherein said support system comprises at least one structure defining a cavity, said structure having a slot formed therein extending generally parallel to the longitudinal axis of the cable tray and providing access to the cavity defined by the structure, the cover panel having an inner edge margin which extends generally parallel to the longitudinal axis of the cable tray and which is insertable laterally through the slot into the cavity of the structure when said support system is attached to the cable tray, and a planar lower surface for engagement with said arms when the cover panel is in its closed position and said inner edge margin is disposed within the cavity, the planar lower surface of the cover panel being slidable laterally on the structure in the plane of the lower surface of the panel, and pivotable on the structure about an axis generally parallel to the longitudinal axis of the cable tray between said open and closed positions, the cover panel being removable from the support system by moving the edge margin of the panel laterally outwardly through the slot.

3. A cable tray system as set forth in claim 2 wherein when the cover panel is pivoted to its open position, the inner edge margin of the cover panel is adapted to slide down into a lower portion of said cavity into a position in which the inner edge margin is engageable with said at least one structure to hold the cover panel in its said open position without assistance.

4. A cable tray system as set forth in claim 3 wherein said at least one structure comprises a generally C-shaped channel defining said cavity, and wherein said lower portion of the cavity is generally rectangular in shape.

5. A cable tray system as set forth in claim 4 wherein said channel has an upper wall, a lower wall, a side wall connecting the upper and lower walls, an upper flange extending down from the upper wall, and a lower flange extending up from the lower wall, said upper and lower flanges terminating in edges defining said slot therebetween, said slot having a width greater than the thickness of the cover panel whereby said inner edge margin of the cover panel may be inserted laterally through the slot into the cavity.

6. A cable tray system as set forth in claim 4 wherein the cover panel has a lip extending along the inner edge margin of the cover panel, and wherein said lip is engageable with the side wall of the channel when the cover panel is in its open position to hold the cover panel in its open position.

7. A cable tray system as set forth in claim 6 wherein said lip is receivable in a notch formed in the side wall of the channel to assist in holding the cover panel in its open position.

8. A cable tray system as set forth in claim 7 wherein said lip is engageable with the C-shaped channel when the cover is in its closed position to prevent lateral movement of the cover panel out of the cavity.

9. A cable tray system as set forth in claim 8 wherein said lip extends upwardly and is engageable with the upper flange of the C-shaped channel to prevent said lateral movement of the panel cover.

10. A cable tray system as set forth in claim 9 wherein the lower wall of the C-shaped channel has a width greater than the width of the upper wall, and wherein said lower flange has a height greater than the width of the lower wall.

11. A cable tray system as set forth in claim 5 wherein the cover panel has a lip extending along the inner edge margin of the cover panel, said lip having a depth not substantially less than the width of said lower wall of the C-shaped channel.

12. A cable tray system comprising
a cable tray for carrying cable, said cable tray having a central longitudinal axis and comprising a center beam and a plurality of arms extending laterally outward from the center beam at opposite sides of the beam for carrying cable,
a support system comprising at least one support fastened to the center beam, and
at least one cover panel operatively associated with the support system for covering cable carried by the cable tray, the cover panel being engageable with the support system for pivoting about an axis generally parallel to the longitudinal axis of the cable tray between an open position in which the cover panel is swung up and away from the cable tray to permit access to cables in the tray, and a closed position in which the cover panel is swung down to cover cables in the cable tray, the cover panel being removable from the support system without removing the support system from said cable tray, said support system comprising at least one structure defining a cavity, said structure having a slot formed therein extending generally parallel to the longitudinal axis of the cable tray and providing access to the cavity defined by the structure, the cover panel having an inner edge margin which extends generally parallel to the longitudinal axis of the cable tray and which is insertable laterally through the slot into the cavity of the structure when said support system is attached to the cable tray, said cover panel being engageable with the structure for pivoting about an axis generally parallel to the longitudinal axis between said open and closed positions, the cover panel being removable from the support system by moving the inner edge margin of the panel laterally outwardly through the slot.

13. A cable tray system as set forth in claim 12 comprising a pair of said cover panels, said support system comprising two of said structures defining two of said cavities at opposite sides of the support system.

14. A cable tray system as set forth in claim 13 wherein said support system further comprises a base rigidly connecting said structures, said structures extending up from the base at opposite sides of the base, and means for attaching the base to the center beam of the cable tray.

15. A cable tray system as set forth in claim 14 further comprising a center cover spanning said structures above the base for covering said support system.

16. A cable tray system as set forth in claim 15 wherein said center cover is releasably engageable with said structures for permitting quick attachment and detachment of the center cover to and from said support system.

17. A cable tray system as set forth in claim 16 wherein said center cover has depending flanges frictionally engageable with the upper flanges of the C-shaped channel to releasably retain the center cover in place.

18. A cable tray system as set forth in claim 14 further comprising spaced apart positioning members on the base engageable with opposite sides of the center beam of the cable tray to properly position the base on the beam in a transverse direction with respect to the beam.

19. A cable tray system as set forth in claim 14 wherein said support system comprises a pair of braces extending up from the base to said structures.

20. A cable tray system comprising
a cable tray for carrying cable, said cable tray having a central longitudinal axis and comprising a center beam and a plurality of arms extending laterally outward from the center beam for carrying cable,
a support system comprising at least one support fastened to the cable tray,
at least one cover panel operatively associated with the support system for covering cable carried by the cable tray,
the cover panel being engageable with the support system for pivoting about an axis generally parallel to the longitudinal axis of the cable tray between an open position in which the cover panel is swung up and away from the cable tray to permit access to cables in the tray, and a closed position in which the cover panel is swung down to cover cables in the cable tray, the cover panel being removable from the support system without removing the support system from said cable tray, and a stand-off adapted for attachment to the center beam of the cable tray for supporting the support system at a predetermined elevation above the beam.

21. A cable tray system as set forth in claim 20 comprising a plurality of stand-offs of different heights corresponding to different predetermined elevations above the center beam.

22. A cable tray system as set forth in claim 20 wherein said at least one cover panel is removable from the support system without removing the support means from the stand-off or the stand-off from said center beam.

23. A cable tray system comprising a cable tray for carrying cable, said cable tray having a central longitudinal axis and comprising a pair of side rails connected to opposite sides of a center section for carrying cable, a support system comprising at least one support fastened to the cable tray, and at least one cover panel operatively associated with the support system for covering cable carried by the cable tray, the cover panel being engageable with the support system for pivoting about an axis generally parallel to the longitudinal axis of the cable tray between an open position in which the cover panel is swung up and away from the cable tray to permit access to cables in the tray, and a closed position in which the cover panel is swung down to cover cables in the cable tray, the cover panel being removable from the support system without removing the support system from said cable tray.

24. A cable tray system as set forth in claim 23 further comprising stand-off means adapted for attachment to the center section of the cable tray for supporting the support system at a predetermined elevation above the center section.

25. A cable tray system as set forth in claim 24 wherein said at least one cover panel is removable from the support means without removing the support means from the stand-off system or the stand-off means from said center section of the cable tray.

26. A cable tray system as set forth in claim 23 wherein said center section comprises a plurality of cross rungs.

27. A cable tray system comprising a cable tray for carrying cable, said cable tray having a central longitudinal axis, a support system comprising at least one support fastened to the cable tray, a center cover overlying said support system and attached thereto, and at least one cover panel operatively associated with the support system for covering cable carried by the cable tray, the cover panel being engageable with the support system for pivoting about an axis generally parallel to the longitudinal axis of the cable tray between an open position in which the cover panel is swung up and away from the cable tray to permit access to cables in the tray, and a closed position in which the cover panel is swung down to cover cables in the cable tray, the cover panel being removable from the support system without removing the support system from said cable tray.

28. A cable tray system as set forth in claim 27 wherein said cable tray comprises a center beam and a plurality of arms extending laterally outward from the center beam at only one side of the center beam for carrying cable, said support system comprising a base, a structure on the base for supporting said panel for pivotal movement between said open and closed positions, and a wall on the base spaced from said structure, said center cover spanning said structure and said wall and being releasably engageable therewith.

29. A cable tray system as set forth in claim 28 wherein said center cover has depending flanges frictionally engageable with said structure and the wall for releasably retaining the center cover in place.

30. A cable tray system, as set forth in claim 27 wherein said cable tray has a center section for carrying cable and a pair of side rails connected to the center section at opposite sides of the center section, and further comprising a pair of said cover panels, said support system comprising a base and two structures on the base for supporting said panels for pivotal movement between said open and closed positions, said center cover spanning said structures above the base and being releasably engageable with said structures.

31. A cable tray system as set forth in claim 30 wherein said center cover has depending flanges frictionally engageable with said structures for releasably retaining the center cover in place.

32. A cable tray system as set forth in claim 1 wherein said support system is a one-piece extruded metal part.

* * * * *

UNITED STATES PATENT AND TRADEMARK OFFICE
CERTIFICATE OF CORRECTION

PATENT NO. : 5,730,400
DATED : March 24, 1998
INVENTOR(S) : Eric R. Rinderer et al.

It is certified that error appears in the above-identified patent and that said Letters Patent is hereby corrected as shown below:

Column 9, claim 25, lines 47-48, "means without removing the support means from the standoff system" should read ---system without removing the support system from the standoff means---.

Signed and Sealed this

Eighteenth Day of August, 1998

Attest:

BRUCE LEHMAN

Attesting Officer

Commissioner of Patents and Trademarks